A. BARR & W. STROUD.
OPTICAL ADJUSTER FOR RANGE FINDERS.
APPLICATION FILED JULY 29, 1916.
1,229,209.
Patented June 12, 1917.
FIG: 1.
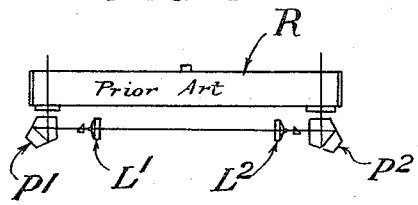
FIG: 2.
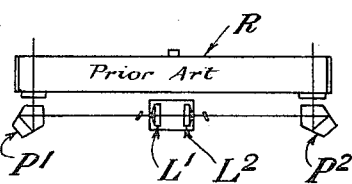
FIG: 3.
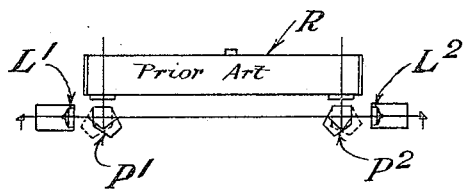
FIG: 4.
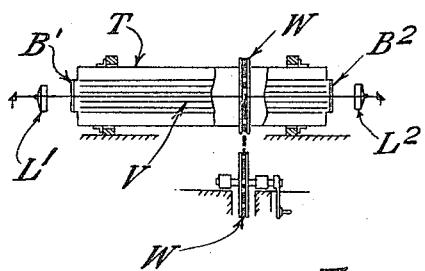
FIG: 5.
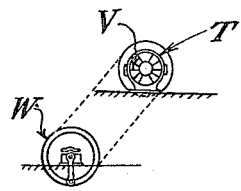
FIG: 6.
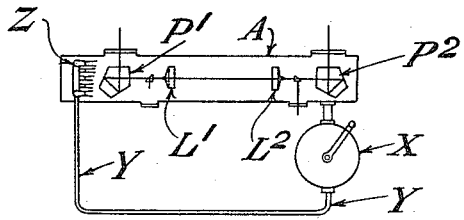
Inventors.
Archibald Barr.
William Stroud.
By J. Walter Fowler
Atty.

UNITED STATES PATENT OFFICE.

ARCHIBALD BARR AND WILLIAM STROUD, OF ANNIESLAND, GLASGOW, SCOTLAND, ASSIGNORS TO BARR AND STROUD, LIMITED, OF GLASGOW, SCOTLAND.

OPTICAL ADJUSTER FOR RANGE-FINDERS.

1,229,209.  Specification of Letters Patent.  Patented June 12, 1917.

Original application filed June 8, 1915, Serial No. 32,989. Divided and this application filed July 29, 1916. Serial No. 112,166.

*To all whom it may concern:*

Be it known that we, ARCHIBALD BARR and WILLIAM STROUD, subjects of the King of Great Britain and Ireland, and both of Caxton street, Anniesland, Glasgow, Scotland, have invented new and useful Improvements in Optical Adjusters for Range-Finders, of which the following is a specification.

The object of this invention is to provide means for eliminating or reducing the errors arising from variations in refractive power throughout the columns of air traversed by the beams of light in optical adjusting devices for use in connection with rangefinders.

In all types of optical adjusters there exists liability to errors, arising from variations in refracting power (due to variation of temperature) throughout the columns of air traversed by the beams of light. The magnitude of the probable resulting error will also depend upon the lengths of the paths of the beams, and thus becomes of greater and greater importance in the case of most adjusting devices, as the base length of the rangefinder is increased.

If one side of a column of air is maintained at a higher temperature than the other side, the density and refracting power of the air at that side will be smaller, with the result that the beam in the direction of the length of the column will follow a curved instead of a straight path. The amount of bending will depend upon the temperature gradient across the beam and the total length of the column of air.

According to our present invention we eliminate or reduce these air refraction errors by providing means for reducing to a minimum the difference in refractive indices of the portions of air through which the two sides of the adjuster beams respectively pass. This we accomplish by producing currents so as to fill the space with air of approximately uniform temperature, or by mixing the various portions of air, and so equalizing the temperatures.

In the further description of our invention reference will be made to some examples of construction illustrated in the accompanying drawing, in which:—

Figures 1, 2 and 3 are diagrammatic representations of adjusters of known types shown in connection with rangefinders of the short base single observer type.

Figs. 4, 5 and 6 illustrate constructional applications of our invention.

In Figs. 1 and 2, two forms of one class of adjuster, and in Fig. 3 an example of another class of adjuster are shown in association with a rangefinder.

In the drawing, R designates the rangefinder, $L^1$ $L^2$ objective mark glasses and $P^1$ $P^2$ prisms of the adjuster.

When the objective mark glasses $L^1$ and $L^2$ are situated near the ends of the apparatus (as in Fig. 1) the length of the column of air traversed by each of the beams of light is at least equal to the length of the base, and the effects of refraction caused by inequalities in the refractive power of the air on the two sides of the beam are additive. When the objective mark glasses $L^1$ and $L^2$ are placed nearer together as indicated in Fig. 2, the errors are still additive, but the total length of the column of air traversed is reduced inasmuch as it is approximately the length of the base plus the length between the objectives $L^1$ and $L^2$.

When the adjuster is of the type indicated in Fig. 3, the errors are again additive, and the total column of air is again at least twice the length of the base.

In the examples illustrated at Figs. 1 to 3, the adjuster parts are held in a tube separate from that of the rangefinder, but the adjuster parts are frequently inclosed in the tube or case which forms the body of the rangefinder. In apparatus of this description we may apply our invention to the case of the rangefinder and adjuster.

Figs. 4, 5 and 6 show means of carrying our invention into effect, those illustrated at Figs. 4 and 5 being in connection with the column of air between the objective mark glasses $L^1$ and $L^2$ and those at Fig. 6 in connection with the column of air between the prisms $P^1$ $P^2$ of Fig. 1, but they can be applied to the air columns of other arrangements of adjusters and we do not confine ourselves to the particular means indicated.

In Figs. 4 and 5, T is a tubular casing, axially mounted between the objective mark glasses $L^1$ $L^2$, V are radial or curved vanes projecting inwardly from the interior periphery of the tubular casing T, and W is a wheel and band mechanism for rotating the tubular casing T. We may inclose the space within the tubular casing T, for instance, by providing windows $B^1$ $B^2$ at the ends thereof, or we may leave it open at the ends. When the tubular casing T is rotated by means of the mechanism W, or other appropriate device, the air within the casing T is churned and thoroughly mixed by the action of the vanes V and the temperature throughout the column of air contained within to be traversed by the adjuster beam is thereby equalized.

Fig. 6 shows another means of equalizing the temperature by circulating the air, and in some cases also churning the air. In this construction, A designates a case inclosing the adjuster parts, $L^1$ and $L^2$ are the objective mark glasses, and $P^1$ and $P^2$ are the prisms. Z is a distributer comprising a nozzle or series of nozzles so arranged as to project jets of air through the interior of the case A. X is an air circulating mechanism of any suitable type, Y is a connection between the circulator X and the distributer Z. When the circulator is operated, the air is drawn from the case A and forced through the connection Y and the distributer Z and again through the case A to the circulator. Vanes to direct the currents of air and baffle plates to mix the air may be introduced within the case A.

This application is a division of our application for Letters Patent filed 8th June, 1915, Serial No. 32989.

We claim:

1. The method of increasing the accuracy of optical adjusters for use in connection with self contained base rangefinders by mixing and circulating the air inclosed in the apparatus through which different parts of the operative beams of light pass, substantially as set forth.

2. An optical adjuster for use in connection with a self contained base rangefinder having the whole or a part of the space traversed by the adjuster beams inclosed, associated with means for circulating and mixing the air contained within the said space.

3. An optical adjuster for use in connection with a self contained base rangefinder having objective mark glasses with a space between them, a case inclosing the said space, and means for circulating the air within the space.

4. An optical adjuster for use in connection with a self contained base rangefinder having objective mark glasses with a space between them, a case inclosing the said space, and means for circulating the air within the space, associated with prisms forming parts of the adjuster placed inside the said case.

5. An optical adjuster for use in connection with a self contained base rangefinder having objective mark glasses and prisms, a case inclosing the said glasses and prisms, and an air circulating mechanism connected with the casing, for the purposes set forth.

6. An optical adjuster for use in connection with a self contained base rangefinder having objective mark glasses and prisms, a case inclosing the said glasses and prisms, an air circulating mechanism, a connection between the said mechanism and the case and between the mechanism and a distributer arranged within the case, for the purposes set forth.

ARCHIBALD BARR.
WILLIAM STROUD.

Witnesses:
  WILLIAM PENDRICH,
  OSWIN E. H. BIRCHAU.